United States Patent [19]
Soderquist et al.

[11] Patent Number: 5,580,080
[45] Date of Patent: Dec. 3, 1996

[54] CUSHION ATTACHMENT FOR AIRBAGS

[75] Inventors: Quin Soderquist, South Weber; Patricie G. Cochran, Brigham City; Christina D. Slate, Roy, all of Utah

[73] Assignee: Morton International, Inc., Chicago, Ill.

[21] Appl. No.: 531,113

[22] Filed: Sep. 20, 1995

[51] Int. Cl.⁶ .................................................. B60R 21/16
[52] U.S. Cl. ................................ 280/728.2; 280/743.1
[58] Field of Search ........................... 280/728.2, 743.1, 280/743.2, 731, 728.1, 729

[56] References Cited

U.S. PATENT DOCUMENTS

| | | | |
|---|---|---|---|
| 5,226,671 | 7/1993 | Hill | 280/743.1 |
| 5,263,738 | 11/1993 | Oda et al. | 280/728.2 |
| 5,275,431 | 1/1994 | Stephens | 280/728.2 |
| 5,308,110 | 5/1994 | Kokeguchi | 280/728.2 |
| 5,409,256 | 4/1995 | Gordon et al. | 280/728.2 |
| 5,421,607 | 6/1995 | Gordon | 280/728.2 |
| 5,447,330 | 9/1995 | Tagawa et al. | 280/743.1 |
| 5,509,685 | 4/1996 | Boyle, III | 280/728.2 |

FOREIGN PATENT DOCUMENTS

| | | | |
|---|---|---|---|
| 484527 | 5/1992 | European Pat. Off. | 280/728.2 |
| 625448 | 11/1994 | European Pat. Off. | 280/728.2 |
| 2-133266 | 5/1990 | Japan | 280/728.2 |
| 3-153438 | 7/1991 | Japan | 280/728.2 |
| 3-292237 | 12/1991 | Japan | 280/743.2 |
| 2268124 | 1/1994 | United Kingdom | 280/728.2 |

*Primary Examiner*—Brian L. Johnson
*Assistant Examiner*—Peter C. English
*Attorney, Agent, or Firm*—Taylor J. Ross; Gerald K. White

[57] ABSTRACT

A mounting arrangement for an airbag cushion. The cushion is provided with a mounting portion adjacent the cushion mouth. The mounting portion is connected about the periphery of the mouth, preferably on the interior, and extends peripherally outward from the mouth to a collar. This collar is received and secured between a mounting plate and the inflator, and includes holes to receive the bolts extending between the mounting plate and the inflator. The mounting portion may take many forms. A first embodiment includes a plurality of fabric sheets secured at their inner edge about the periphery of the cushion mouth. In a second embodiment, the fabric sheets include overlapping tabs which pass through the mouth of the cushion. In a third embodiment, strips of fabric are formed into a loop, with one longitudinal end being secured to the mouth of the cushion. The sheets may be oriented and arranged such that gas vents between the sheets to alter the inflation of the cushion.

22 Claims, 3 Drawing Sheets

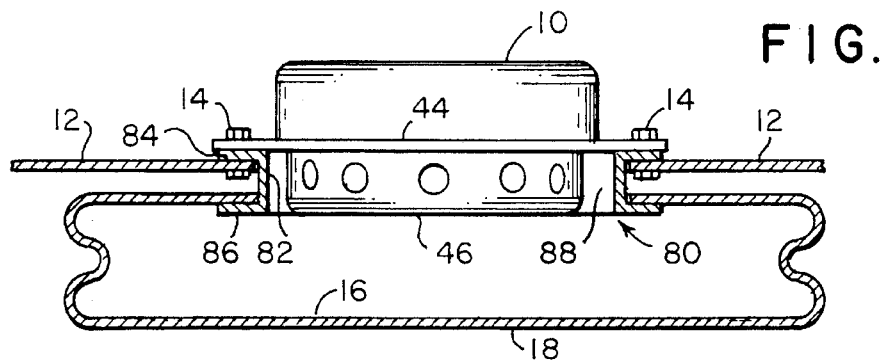
FIG. 11
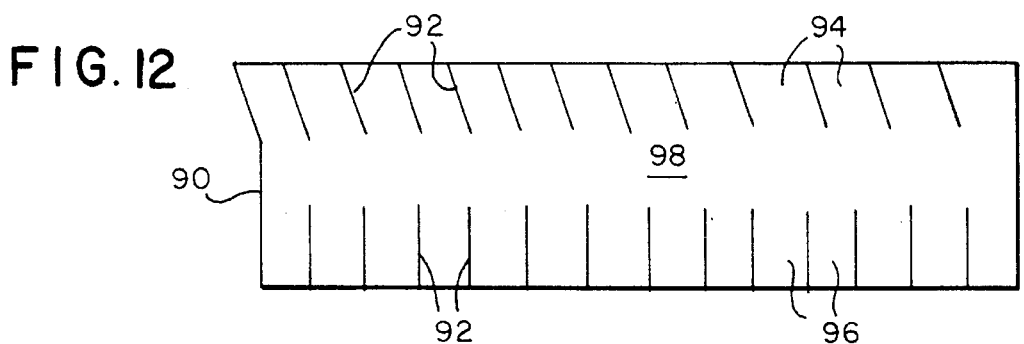
FIG. 12
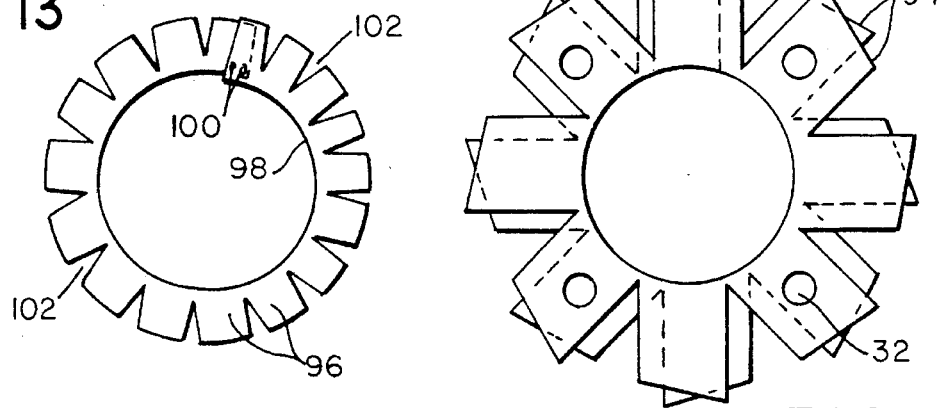
FIG. 13
FIG. 14
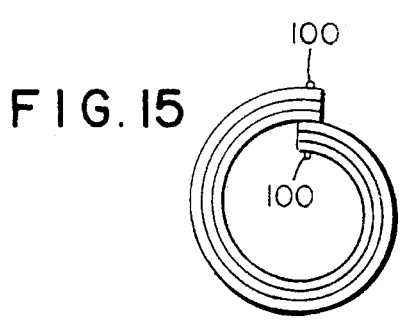
FIG. 15
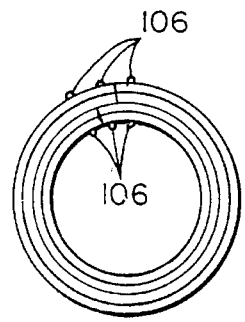
FIG. 16

5,580,080

CUSHION ATTACHMENT FOR AIRBAGS

BACKGROUND OF THE INVENTION

1. Field of the Invention

The present invention relates in general to vehicle passive restraint systems of the type typically known as airbags. In particular, the present invention relates to an improved arrangement for attaching an inflatable cushion to an inflator.

2. Description of the Related Art

Airbag passive restraint systems generally include a crash sensor, an inflator, and a Cushion. The crash sensor determines when the airbag system should be activated, and sends an appropriate signal to the inflator. Upon receipt of the signal, the inflator expels a quantity of gas. This gas is received within the cushion, causing it to inflate to protect the passenger.

A common problem in airbag system design has been the attachment of the cushion to the inflator. This is because the gas is expelled from the inflator with a large velocity in order to inflate the cushion within the short amount of time available (on the order of 10 ms). This high velocity gas creates a force in the cushion tending to blow the cushion from the inflator.

The connection between the cushion and the inflator must of course be strong to retain the cushion, but should also be simple to assemble and inexpensive to produce. Various arrangements have been employed to connect the cushion to the inflator. Many of these are rather complex, and require a great deal of assembly time. One of the more simple arrangements is disclosed in U.S. Pat. No. 5,259,641 to Schenk et al. In the Schenk et al. patent, the mouth or inlet opening of the cushion is placed upon one side of a mounting plate, while the inflator is placed against the other side of the mounting plate. A rigid reinforcing ring is then placed over the mouth of the cushion, to hold the mouth between the ring and the mounting plate. The fasteners which hold the inflator to the mounting plate also hold the ring, and thus the cushion, to the plate.

While this arrangement provides a secure mounting for the cushion, it is still sufficiently complex that it increases the time required to assemble the airbag system, and increases its cost. In particular, the use of the separate mounting ring requires that it be fabricated from metal, that it be manually inserted into the cushion, and that the fastener process is only visible from one side.

SUMMARY OF THE INVENTION

An object of the present invention is to provide an arrangement to securely fasten an airbag cushion to an inflator.

Another object of the present invention is to provide such an arrangement which is simple and inexpensive to produce and assemble.

Yet another object of the present invention is to provide such an arrangement where the inflator may be placed at least partially within the uninflated cushion.

A further object of the present invention is to provide an attachment arrangement for a cushion which can be used to alter the performance of the airbag system.

Yet another object of the present invention is to provide such an attachment arrangement which may be altered to provide gas venting.

These and other objects are achieved by a mounting arrangement for an airbag cushion. The cushion is provided with a mounting portion adjacent the cushion mouth. The mounting portion is connected about the periphery of the mouth, preferably on the interior, and extends peripherally outward from the mouth to a collar. This collar is received and secured between a mounting plate and the inflator, and includes holes to receive the bolts extending between the mounting plate and the inflator. The mounting portion may take many forms. A first embodiment includes a plurality of fabric sheets secured at their inner edge about the periphery of the cushion mouth. In a second embodiment, the fabric sheets include overlapping tabs which pass through the mouth of the cushion. In a third embodiment, strips of fabric are formed into a loop, with one longitudinal end being secured to the mouth of the cushion. The sheets may be oriented and arranged such that gas vents between the sheets to alter the inflation of the cushion.

BRIEF DESCRIPTION OF THE DRAWINGS

The objects and features of the invention noted above are explained in more detail with reference to the drawings, in which like reference numerals denote like elements, and in which:

FIG. 11 is a side view in partial cutaway of an airbag inflator and cushion according to a third embodiment of the invention;

FIG. 12 is a plan view for a strip according to the third embodiment of the invention;

FIG. 13 is a bottom view of the mounting portion of FIG. 11;

FIG. 14 is a top view of the mounting portion of FIG. 11; and

FIGS. 15 and 16 are detail views showing alternative overlap arrangements for the strips of FIG. 12.

DETAILED DESCRIPTION OF THE INVENTION

Figure 1:
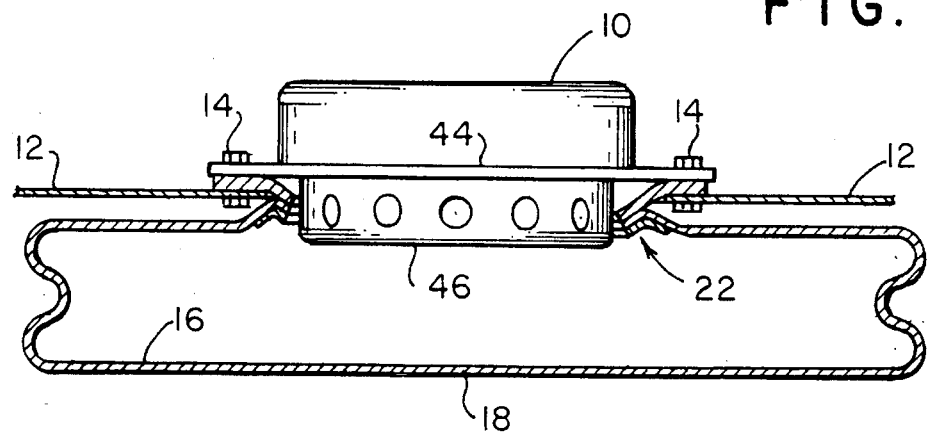
FIG. 1 is a side view in partial cutaway of an airbag inflator and a cushion according to a first embodiment of the invention.

Prior to beginning the description, it is noted that the various layers shown in the drawings are not to scale, but have been exaggerated and/or simplified for clarity.

With reference to FIG. 1, there is shown an inflator 10 secured to a mounting plate 12 by a plurality of bolts 14, as is known in the prior art. Also connected to the inflator is a cushion 16 according to the present invention.

Cushion 16 includes a main body 18 which may take any form well known in the prior art. For example, two circular pieces of suitable fabric may be laid one on top of the other, and a seam formed about their periphery. Whichever type of main body is employed, the cushion will include a mouth 20 (FIG. 2) in the form of a cut out or opening through the fabric of the cushion. It is in this area that the cushion 16 differs from the prior art.

Figure 2:
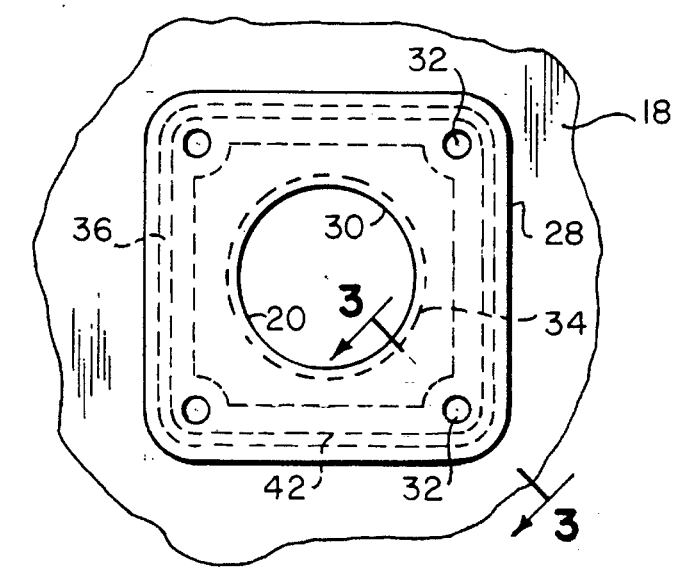
FIG. 2 is a plan view of the mounting portion of the cushion of FIG. 1.
Figure 3:
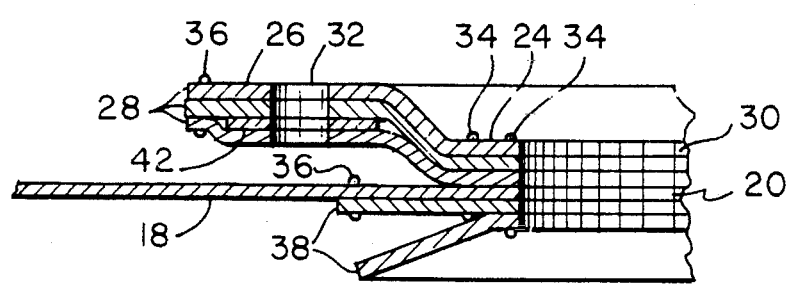
FIG. 3 is a cross-sectional view along line 3—3 of FIG. 2.

As is best seen by comparison of FIGS. 2 and 3, secured about the mouth 20 is a mounting portion 22. The portion 22 includes a spacer section 24 and a connecting section or collar 26. The spacer section is secured to the cushion at least in proximity, and at least partially surrounding, the mouth 20 of the cushion. In the embodiment shown, the spacer section fully surrounds the mouth, and is connected to the exterior of the cushion. The collar is an integral part of the spacer section, and is located peripherally outward from the spacer section. The collar is not itself directly secured to the cushion, and as such the collar may be moved away from the cushion as far as is permitted by the secured spacer section, for reasons described more fully below.

In the preferred embodiment, the mounting portion is formed by at least one, and preferably a plurality of sheets of fabric 28. The material of the fabric may be standard fabric as used for the body of the airbag, or other flexible fabric or sheet material which provides sufficient strength and temperature resistance. Depending upon the type of inflator (i.e., axial or radial gas exit), and the various dimensions, it may be necessary to employ coated fabric to withstand the heat of the inflation gas.

Each of the sheets 28 may have a substantially identical configuration, with a central opening 30 having a size and shape corresponding generally to the mouth 20 of the cushion, and aligned therewith. This opening defines the inner edge of the spacer section 24. The outer periphery of the sheets form the collar 26. In the collar the sheets are provided with a plurality of mounting holes 32 in a configuration to match the mounting holes in the inflator 10 which receive the bolts 14.

As is best shown in FIG. 3, the sheets 28 are assembled in a stack (in the embodiment shown this is a stack of three sheets), and the spacer section is secured to the cushion. This may be achieved by various means, such as adhesives, fasteners, thermal or ultrasonic welding, etc. It is preferred, however, that the means take the form of one or more lines of stitching 34 passed through the spacer section and the cushion to thus join the spacer section and the cushion. To maintain the stack of sheets in an easily manipulated stack, one or more lines of stitching 36 may also be passed through the collar of the stack. It is noted, however, that the stitching in this area does not pass through the cushion, such that the collar is free to move away from the cushion as noted above.

To further improve the strength of the mounting portion, it may include one or more inner sheets 38. The sheets 38 may be formed of material similar or identical to that for the sheet(s) 28, and include a central opening similar in size and shape to that of mouth 20. This opening is aligned with the mouth in a manner similar to that of the sheets 28, although the inner sheets are placed on the interior of the cushion. By securing the inner sheets to the interior of the cushion, the mouth is further reinforced and strengthened, as well as protected, by the overlying sheets 38.

The inner sheets may be secured by various means, but it is preferred that they be sewn in place similar to the sheets 28. In fact, at least the innermost line of stitching 34 may be additionally used to secure the inner sheets, as shown in FIG. 3. Depending upon the radial thickness or depth of the inner sheets, a further line of stitching may be employed. As will be apparent from the discussion below, the inner sheets, and their stitching, may be subjected to the hot gasses exiting from the inflator 10. To provide a sufficiently secure attachment, it may therefore be necessary to form the stitching 34 from coated thread (e.g., silicon coated thread), and to form the inner sheets from a coated material. However, a preferred form of the invention provides adequate temperature protection while reducing cost.

In particular, it is possible to form only the outermost (i.e., visible) one of the inner sheets 38 from a coated material, such that this outermost sheet covers and protects the remaining sheets. Furthermore, this outermost sheet may be secured only at its innermost edge with the high temperature stitching, as shown. Again, the outermost sheet would then cover and overly the remaining stitching, permitting these stitches to be formed of lesser grade materials. This of course assumes that the inflator gasses will be extremely hot, which is not true of all inflator types. The sheets and stitching may of course be formed of regular, temperature sensitive materials when the inflator gasses are not hot.

A further method of reinforcing the mounting portion 22 is shown in FIGS. 2 and 3. This further reinforcing takes the form of a rigid plate 42 secured to the collar 26. The plate 42 will preferably include a plurality of mounting holes similar to, and aligned with, holes 32 in the sheets. The plate may be secured by adhesives or other means, but may advantageously be secured by placing the plate between two of the sheets 28 prior to sewing. The plate will thus be secured to the connecting section with no additional materials required.

With reference again to FIG. 1, the mounting of the cushion to the inflator will be described. The inflator 10 will include a mounting flange 44 which includes the holes through which bolts 14 extend. Protruding forward from this flange is a diffuser 46 including several holes from which the gas exits the inflator. The inflator flange is pressed against the mounting plate 12 with the diffuser extending through an opening formed in the mounting plate. As noted above, the mounting plate also includes holes through which the bolts 14 pass. All of this mounting arrangement is prior art. The inventive aspect is the mounting portion 22 used to secure the cushion.

As noted, this is shown in FIG. 1, where it is seen that the connecting section 26 is held between the flange 44 of the inflator and the mounting plate 12, with the bolts 14 passing through the holes 32 in the sheets 28. In this position the mounting plate is located between the collar 26 and the cushion 16. The collar has a sufficient length, however, that the spacer section 24 is within the opening of the mounting plate 12, and as such the cushion 16 may be on the opposite side of the plate 12 from that of the collar 26. Therefore, the mounting portion may be received between the inflator flange and the mounting plate, while the cushion is located forward of the mounting plate.

As shown, the diffuser extends into the cushion. This is a preferred arrangement for certain inflator types and uses. Here, it may be seen that the radial gas exit holes in the diffuser are adjacent to the mounting portion 22. As such, it may be necessary to employ the temperature resistant materials, as noted. However, it may be possible to employ standard materials, even though the diffuser expels hot gas. Specifically, the gas may exit from the diffuser holes with sufficient velocity that the individual gas streams do not diffuse or expand rapidly in diameter. This may result in the gas streams not fully impinging upon the mounting portion, even though it is close to the diffuser.

As such, it is possible that simply using the temperature resistant material for the outermost one of the inner sheets 38, and using this sheet to cover the stitching, will be sufficient even when used with a hot inflator. While the stitch line securing the sheet would not be temperature resistant, the hot gas would not impinge upon this stitching, and it would withstand its environment.

The placement of the collar in position is simply a matter of physically moving the connecting section through the opening in the mounting plate 12. The flexible nature of the fabric facilitates this movement. As may be envisioned, however, this is not possible if the reinforcing plate 42 is used. For that situation, the cushion will be physically moved through the opening in the mounting plate while the connecting section remains in its proper position. Again, the flexible nature of the cushion facilitates this movement. Thereafter, the same bolts which secure the inflator flange pass through the mounting holes 32 to secure the mounting portion and cushion. It is also noted that the bolts 14 are fully accessible, and are not in any way obscured by the presence of the mounting portion.

As may be seen, the present invention provides a reinforcement for the mouth of an airbag cushion which will provide sufficient strength to retain the cushion on the inflator. Additionally, the reinforcement material may be connected to the inflator, such that additional reinforcement rings need not be provided, as was the case with the prior art described above. Furthermore, the layers of material in the mounting portion will each increase the strength of the reinforcement, and the number of layers may be chosen to provide the required strength. Providing an offset (e.g., 45°) in the weave direction between layers may also be used to increase strength. Finally, the assembly process requires only that the mounting portion be placed in position and secured with the same bolts as the inflator. As such, the present invention provides a cushion mounting having reduced materials cost and faster, easier assembly.

Figure 7:
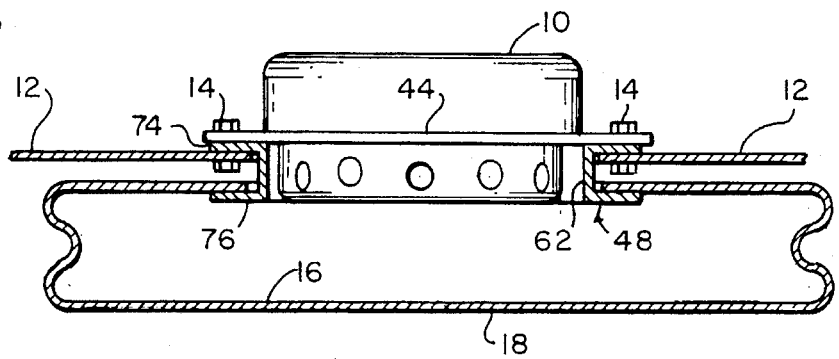
FIG. 7 is a side view in partial cutaway of the airbag inflator and cushion according to the second embodiment of the invention.
Figure 4:
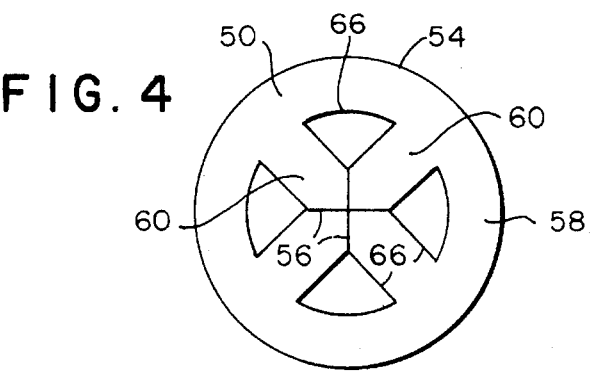
FIG. 4 is a plan view of a sheet for a second embodiment of the present invention.

With reference to FIGS. 4–9, a second embodiment of the present invention is disclosed, where a second embodiment of the mounting portion is generally designated by reference numeral 48 (FIG. 7, shown as a single layer for clarity). In this embodiment, the mounting portion is formed by a plurality of petal sheets 50 and ring sheets 52. As is best shown in FIG. 4, each of the unassembled petal sheets may be formed from a section of material, which, as in the first embodiment may be the same type of material used in the cushion, a different flexible material, or a heat resistant material.

As shown, each of the unassembled petal sheets has a periphery 54, which in this embodiment is circular. In contrast to the first embodiment however, a circular opening is not formed in the sheets 50. Rather, a series of radial cuts 56 are formed from the center of the sheet. In the embodiment shown, four symmetric cuts 56 are formed, although other numbers, and asymmetric cuts, could be used. Radially exterior of these cuts there is a peripherally extending expanse of the sheet which remains whole, and which defines a connecting edge 58. In the embodiment shown, due to the circular periphery, the connecting edge is annular. The ring sheet(s) 52 will typically have a size and shape corresponding to that of the connecting edge.

Figure 6:
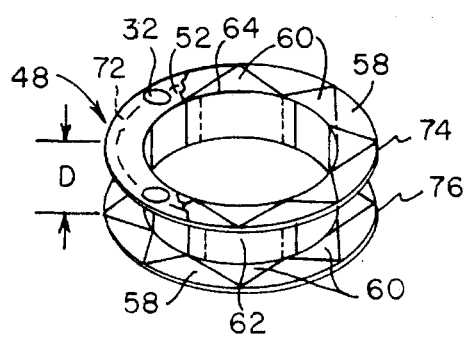
FIG. 6 is a perspective view of the sheets of FIG. 5 assembled into a cushion mounting portion.

Between each of the cuts 56 there is defined a petal 60, with four petals formed in the embodiment shown. As described more fully below, the petals will be bent downward to form a throat portion 62 extending from a diffuser opening 64 (FIG. 6). To assist in the bending and to form a more circular opening, each of the petals may have a notch 66 removed from one or both circumferential edges at the radially outward end of the petal, which corresponds to the position at which the opening will be formed. This causes the petals to take a more elongated, and less triangular, form.

Figure 5:
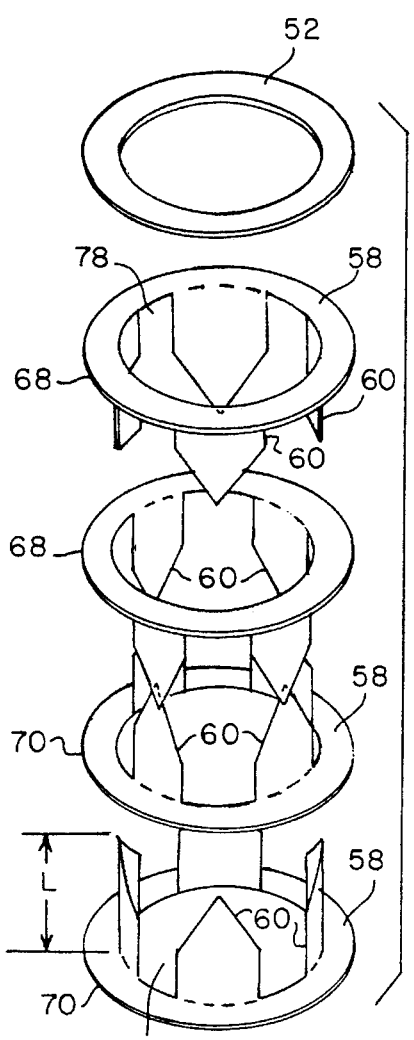
FIG. 5 is an exploded view showing the assembly of the sheets of FIG. 4.

As is best shown in FIG. 5, a plurality of the petal sheets will be provided, with four being used in the embodiment shown. While it is preferred that each of the sheets 50 be substantially identical, petal sheets having diverse peripheral configurations or numbers or shapes of petals may be employed. As shown, one or more of the sheets 50 will be used as outer sheets 68, while the remainder of the sheets will be used as inner sheets 70. The designation "inner" and "outer" refers to the location of the connecting edge 58 on the cushion. Specifically, the connecting edge of the outer sheets will be outside of the cushion, while the connecting edge of the inner sheets 70 will be inside the cushion, as best shown in FIG. 7.

With further reference to FIG. 5, the assembly of the petal sheets 50 into the mounting portion 48 will be described in detail. Specifically, each of the petal sheets 50 and the ring sheets 52 will be arranged in a parallel orientation. Next, each of the outer sheets 68 will have their petals 60 bent in a first direction (downward in the figure), while the inner sheets 70 will have their petals 60 bent in the opposite direction (i.e., upward). It is to be understood that the flexible nature of the sheets may require that the petals be physically held in the proper position. The bending of the petals is at their radially outermost extent (i.e., at the opening 64), such that only the connecting edge 58 remains in the original plane at this time.

Thereafter, all of the outer sheets 68 are moved to bring their connecting edges together into a single stack, and this same process is repeated for the inner sheets 70, thus forming two of these stacks. During this operation the connecting edges of each stack will form layers stacked in the longitudinal direction, while the petals will form layers stacked in the radial direction. The two stacks of inner and outer sheets are then moved toward each other.

During this movement the respective layers of petals for the inner and the outer sheets will preferably remain together. Additionally, it is preferred that petals of the inner sheets remain radially interior of the petals of the outer sheets. As such, the petals will form radially inner layers of inner sheet petals and then radially outer layers of outer sheet petals. While this is preferred, it is possible to reverse this orientation.

The movement of the stacks continues until the connecting edges of the outer and inner sheets, respectively, are spaced from each other by a distance which is equal to the length L of the petals. At this point the outer ends of the petals of the outer sheets will just touch the connecting edge of the stack of inner sheets. The outer ends of the inner sheet petals, being radially interior, will not touch the connecting edge of the outer sheets, but will be adjacent its inner edge.

The movement of the stacks does not stop at this point, however, but continues on until the respective stacks of connecting edges are spaced from each other by a distance less than the length of the petals. In other words, the fully extended petals will have a longitudinal length L, as shown in FIG. 5, yet the respective stacks will be spaced from each other by a longitudinal distance D, as shown in FIG. 6, and this distance D is less than the length L.

To accommodate this, the petals of the outer sheets are folded radially outward, and rest upon the upper face of the stack of inner sheet connecting edges, as shown in the lower half of FIG. 6. The petals of the inner sheets will initially extend longitudinally outward beyond the connecting edges of the outer sheets, from their position within the opening 64 of those outer sheets. As the final folding step, these petals of the inner sheets are folded radially outward to rest upon the connecting edge of the stack of outer sheets, as shown in the upper half of FIG. 6.

At this point the assembled sheets will take the form of a torroid having its radially outer section removed (outward from a tube created by movement of a longitudinal line, approximately bisecting the torroid, about the center of the torroid), as shown in FIG. 6. If used, one or more of the ring sheets 52 may be placed over the ends of the petals of the inner sheets, which are exposed on the outer sheet connecting portion. The ring sheet(s) thus serve to protect the petals, as well as to provide additional strength.

The petals of the inner sheets are then secured to the connecting portions of the outer sheets. As in the first embodiment this may be by various means such as adhesives, thermal bonding, etc. The preferred means, however, is again to provide one or more radially spaced lines of stitching 72. This stitching will extend completely through the inner petals and the outer connecting portions, and any ring sheets, to secure these elements in a single outer collar 74.

A similar attachment of the petals of the outer sheets to the connecting portions of the inner sheets is also effected to form an inner collar 76. As is best shown in FIG. 6, the mounting portion 48 will thus consist of the inner and outer collars 74 and 76 in spaced parallel relation, with the tubular throat portion 62 extending therebetween. This throat portion will be entirely formed of the layered petals, and will define the opening 64 of the mounting portion.

To secure the mounting portion 48 to the cushion 16, the inner collar is inserted through the mouth 20 of the cushion. The mouth of the cushion is sized and shaped to approximately correspond to the exterior of the throat portion 62. As such, the radially extending inner collar 76 will extend about the mouth 20, and may be secured to the cushion at that location. As with the petals, various means may be used, but it is preferred that the same stitching which is used to secure the various layers of the inner collar together is also used to secure the inner collar (and thus the mounting portion) to the cushion.

At this point the various mounting holes 32 may be formed through the outer collar. The mounting holes will be located such that they correspond to the location of the bolts used to secure the inflator to the mounting plate 12. The holes 32 in the collar could alternatively be formed after the outer collar is sewn, but before the inner collar is secured to the cushion. As a further variation, the mounting holes could be formed in the connecting edge 58 of the outer sheets and in the petals of the inner sheets prior to assembly, and then aligned during assembly and before securing the petals to the connecting portions.

The attachment of the mounting portion to the inflator is shown in FIG. 7. As may be seen, the outer collar is simply moved through the opening in the mounting plate 12 before the mounting portion is attached to the cushion. The outer collar is then placed between the inflator and the mounting plate 12, and the same bolts which secure the inflator are passed through the mounting holes to secure the mounting portion to the inflator. In this position, the outer collar secures the mounting portion and cushion, and the throat portion 62 extends parallel to the diffuser. The length of the throat portion may of course be varied by appropriate sizing of the sheets, such that the position of the inner collar 76 with respect to the diffuser may be predetermined. It is preferred, however, that the inner collar be located beyond (i.e., below) the exit holes in the diffuser, such that the throat portion surrounds the exit holes. The diameter of the throat portion is of course larger than that of the diffuser to permit free flow of the gas within the throat portion to inflate the cushion.

This flow of gas through the throat portion permits an advantage present in this second embodiment. Specifically, this mounting portion 48 may be arranged to permit gas flow radially through the throat portion in situations involving excess gas generation. For example, it is known that the amount of gas generated by common types of inflators varies with the ambient temperature, with an appreciable increase in gas production being achieved at higher ambient temperatures. This increase in gas production can cause the cushion to inflate to an internal pressure which is higher than that desired, and which can make the inflated cushion stiffer than desired. As such, it is desirable to permit venting of this excess gas.

The use of the overlapping petals in this embodiment permits the venting of gas to be predetermined. Specifically, the circumferential arrangement of the various petal layers, and more particularly the openings formed between adjacent petals on the same sheet, may be designed to permit venting of gas from the inflator above a predetermined pressure.

As shown in FIG. 5, the initial folding of the petals produces a circumferential gap 78 between adjacent petals on each sheet 50. If each of the petal sheets was oriented such that their petals precisely laid upon each other (i.e., had the same angular orientation), these gaps would also align and would be present in the throat portion upon assembly. Such a large set of gaps in the throat portion would typically not be desired. As such, the various petal sheets 50 are angularly offset with respect to each other to provide a desired overlap of the petals and reduction or elimination of the gaps 78.

Figure 8:
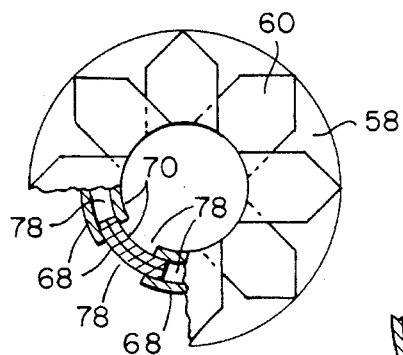
FIG. 8 is a plan view with partial cutaway of the mounting portion of FIG. 6.

Various overlap arrangements are possible. A first arrangement is shown in FIGS. 5, 6 and 8. In this arrangement, there are provided two outer sheets 68 and two inner sheets 70. As is best seen in FIG. 5, the two outer sheets are angularly offset from each other by 90°, as are the two inner sheets. With the particular sizes (i.e., opening 64 diameter, petal width, etc.) shown, this results in the petals of each set of outer and inner sheets overlapping in the circumferential direction, such that the outer sheets form a completely enclosed throat, and the inner sheets form a completely enclosed throat.

In contrast, the immediately adjacent layers of petals in the inner and outer sheets are laid directly upon each other. This is best seen in FIG. 8, where the two innermost layers of petals are in alignment circumferentially. As may be seen, this results in the gaps between petals being offset from each other, and not in direct communication. It should be kept in mind, however, that if the petals are not secured to each other in the throat portion (as is preferred), gas may still flow from gap to gap to pass from the interior of the throat portion to the exterior. For this arrangement, the amount of gas vented should be relatively small, depending upon the pressure and velocity of the gas passing through the throat portion. As may be envisioned, however, with increasing gas pressure, the amount of escaping gas will increase, thus providing the desired pressure limiting feature.

Other petal overlap arrangements will of course provide different amounts of gas flow through the gaps. A second arrangement is shown in FIG. 9, where again there are two outer and two inner sheets, each with four petals. In this arrangement each successive layer is offset 90° with respect to the adjacent layer. With this arrangement the inner and the outer sheets both provide a full throat circumference, as well as the adjacent layers of the inner and outer sheets. As such, this arrangement may provide less gas flow than the first described arrangement.

Figure 9:
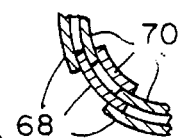
FIGS. 9 and 10 are cross-sectional detail views showing alternative overlap arrangements for the sheets of FIG. 6.
Figure 10:

A third arrangement is shown in FIG. 10, which is identical to the second arrangement of FIG. 9, except that each layer is angularly offset from its next adjacent layer by an amount less than 90°. With this arrangement all four sheets are required to provide the full throat circumference, and a clearly defined path for gas flow is created. As such, this arrangement will vent at much lower pressures. As may be seen, numerous arrangements are possible to vary the amount of venting provided by the throat portion. It is noted that, while not shown, the number and size of the petals may also be varied to further increase the possible arrangements. Additionally, the material of the sheets may be varied, such as if the sheets directly impinged by the gas from the diffuser are formed of a coated, temperature resistant material.

As may be seen, this embodiment provides the desired secure connection of the cushion to the inflator, with a minimum of cost, components and weight. The mounting holes are preferably positioned to extend through a petal, such that the connecting edge(s) 58, petal 60, and ring sheet(s) 52, will provide the multiple layers for strength. As before, adjacent layers may have their weave direction offset to increase strength.

Additionally, this embodiment provides the possibility of predetermined venting of the generated gas. As noted, this may be used to provide standard cushion performance even with variation in inflator performance. This may be used to prevent excessive pressure in the cushion due to variation in ambient temperature. Additionally, it may be used to compensate for variation in overall inflator performance. For example, if, during assembly of the inflators 10, it is found that variation in gas generant composition is resulting in too much gas generation, and resultant excess pressure, it is not necessary to alter the inflator assembly process. Instead, these inflators may simply be fitted with a cushion having a different gas venting characteristic as described above. In this manner, this embodiment permits greater variation in inflator production, reducing scrap and thus reducing cost.

With reference to FIG. 11, a third embodiment of a mounting portion is generally designated by reference numeral 80 (shown as a single layer for clarity). As with the previous embodiment, this mounting portion 80 includes a tubular throat portion 82, having at its longitudinal ends an outer collar 84 and an inner collar 86, with the collars extending radially outward. Also as in the previous embodiment, the mounting portion 80 includes a diffuser opening 88 defined by the interior of the throat portion.

As is best shown in FIG. 12, the mounting portion 80 of this embodiment is formed of a plurality of fringe strips 90. The fringe strips are formed of a flexible cloth, preferably of the same type as used for the cushion 16. As in the previous embodiments, and as discussed in more detail below, one or more of the strips may be formed of a coated fabric for increased temperature resistance. Each of the fringe strips is elongated in what will be the circumferential direction, and includes a series of cuts 92 extending inwardly from, and spaced along, the long, circumferential dimension of the strip. These cuts are located on each of the long edges of the strip, and on a first such edge define a series of outer tabs 94, and on a second edge a series of inner tabs 96. The cuts 92 extend inward across the small dimension a distance less than half of the small dimension. As such, a central portion of the strip extending in the long dimension will have no cuts and will remain whole to define a central section 98.

With reference to FIG. 13, it may be seen that each fringe strip will be curled or bent until the ends of the strip (in the long dimension) are in proximity. This forms the strip into a tubular form with the edges of the tabs at the longitudinal ends. The ends of the strips are then secured in this position. As in the previous embodiments the means for attaching may take many forms, such as adhesives, thermal or other bonding, etc. Also as before, stitching is the preferred attaching means. As such, it is preferred that the ends of the strips are slightly overlapped, and thereafter one or more lines of stitching 100 are passed through the overlapped ends. For reasons which should be clear from the discussion below, this stitching is placed only in the central section 98.

From this initial tubular form, the outer and inner tabs are folded radially outward, as shown for the inner tabs in FIG. 13. Since the tabs are located at various circumferential positions, they extend outward in a manner similar to rays from a point or petals from a flower. Between each pair of adjacent rays on each strip, there will be formed a gap 102 between the tabs, with the circumferential width of the gap increasing in the radially outward direction.

It is preferred that the collars 84 and 86 be at least fairly continuous, and most preferably fully continuous (i.e., form a full annular shape). In this regard it is noted that in this embodiment there are no connecting edges 58 as in the previous embodiment. In this embodiment, the tabs are the only portion of the strips which form the collars. As such, it is preferred to arrange the tabs of the various strips such that for each gap 102 in one sheet, the tab of another strip is aligned with the gap, to thus provide the desired continuous collar.

The relative offset in the strips due to the thicknesses of the strips and the bending to form a tube may provide a sufficient offset of the tabs to accomplish this. However, this can also be accomplished in other ways.

As a first arrangement, the cuts of the various strips may be placed at different locations in the different strips. These cuts may be made in predetermined locations such that upon bending into the tubular form the cuts (and thus the tabs) are circumferentially offset. This will result in the tabs forming a more continuous collar 84 and 86.

As a second arrangement, the cuts may be formed at an angle with respect to the edge of the strip, as shown for the outer tabs 94 in FIG. 12. With this arrangement, the tabs, when folded, will not extend radially outward, but will extend at an angle to the radial. This is best illustrated in FIG. 14. This in itself is not preferred, however, as angled tabs alone would simply offset the gaps 102.

The true utility of the angled cuts is realized by alternating the angle with each adjacent strip. For example, if a first strip has cuts angled at +11° from perpendicular, the adjacent strip will have its cuts angled at −11° from perpendicular. The effect of this angled and alternating cut is shown in FIG. 14. As may be seen, the tabs, when offset at their radially inner end, extend at approximately the same angle, such that the overlap of the tabs is substantially constant in the radial direction. Additionally, the strips may be sized and placed such that mounting holes 32 will be placed precisely within a pair of overlapping tabs, as shown.

While not shown, for clarity, the collars may be made more continuous by the addition of ring sheets 52 as in the previous embodiment. As an example, one ring sheet could be secured above and one below the outer collar. Alternatively or additionally, one or more ring sheets may be secured below the inner collar, such that the inner collar is interposed between the collar sheet(s) and the cushion body.

There are also various alternatives for arranging the strips in a stack. In the above-described arrangement, the strips are simply stacked upon each other in alignment, bent, and stitched. As illustrated in FIG. 15, if three strips are employed, it may be seen that laying the ends of the strips over each other to stitch will result in a thickness of six strips at the stitch area. While this is workable, other arrangements may provide a more uniform thickness.

An alternative arrangement is. Illustrated in FIG. 16. Here, four strips are provided. Both the outer pair and the inner pair of strips are arranged with their respective ends in abutment, rather than overlap. The inner pair of strips is then angularly offset with respect to the outer pair, such that the line of abutment of the ends is spaced from that of the outer pair. A line of stitching 106 may then be passed through each of the ends. As a practical matter, this may only require three such lines, as one line of stitching can hold two ends, as illustrated with the middle line of stitching. As may be seen, this arrangement results in no increase in thickness at the attachment point for the strip ends. This arrangement may of course be used with offset cuts, or the angled and alternating cuts described above, placing the cuts at the appropriate location.

As with the other embodiments, various changes may of course be made. For example, there may be more or less than four strips used. Other arrangements for connecting the ends are also possible, as are other arrangements of cuts and tabs, and overlapping of tabs. Additionally, the innermost strip, adjacent to the diffuser, may be formed of a coated, temperature resistant material, and adjacent layers may have their weave directions offset.

Regardless of which particular arrangement is used, the final form of the mounting portion will be a portion of a torroid, as with the previous embodiment. The assembly of the mounting portion to the cushion and inflator are also the same, with the respective collars being inserted through the openings in the cushion and mounting plate, respectively. The inner collar may be secured to the cushion using means described above, with lines of stitching (possibly the same as used for securing the tabs of the inner collar) being the most preferred. Again, the mounting bolts used to secure the inflator also secure the mounting portion, and thus the cushion.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A cushion for an airbag module, comprising:

a flexible body;

a mouth in said body permitting entry of a gas to inflate said body; and a mounting portion secured to said body in proximity to said mouth, said mounting portion taking the form of a radially interior section of a torroid, with a throat portion having longitudinal ends and an outer collar extending radially outward from one of said ends, said outer collar being in spaced opposed relation to said body and surrounding said mouth, and further including an inner collar extending radially from the other of said ends in spaced parallel relation to said outer collar, said inner collar being secured to said body, said mounting portion being formed of a plurality of sheets, each having a peripheral connecting edge and a plurality of cantilevered petals extending from an interior of said edge, said sheets being arranged in an outer stack and an inner stack, each of said stacks having the connecting edges thereof arranged in opposed, layered relation to define said inner and outer collars, and said petals being folded such that an inner end of said petals form said throat portion, and an outer free end of said petals are secured to the connecting edge of the stack of which said petals are not members.

2. A cushion as in claim 1, wherein said outer collar includes a plurality of mounting holes extending therethrough.

3. A cushion as in claim 1, wherein said sheets are angularly offset with respect to each other such that said inner ends of said petals forming said throat portion are substantially continuous in the circumferential direction.

4. A cushion as in claim 1, wherein said throat portion has a longitudinal length such that, when mounted, said throat portion substantially encompasses a diffuser of an airbag inflator.

5. A cushion as in claim 1, wherein said inner ends of said petals are not secured to each other, and are arranged to permit gas flow therebetween above a predetermined pressure.

6. A cushion as in claim 5, wherein said sheets are angularly offset with respect to each other such that said inner ends of said petals forming said throat portion are substantially continuous in the circumferential direction.

7. A cushion as in claim 1, in combination with an airbag inflator and a mounting plate, said outer collar being interposed between a flange of said inflator and said mounting plate, and said mounting plate being interposed between said outer collar and said body of said cushion.

8. The combination of claim 7, wherein said outer collar includes mounting holes located at positions corresponding to fasteners securing said airbag inflator to said mounting plate.

9. The combination of claim 7, wherein said sheets are angularly offset with respect to each other such that said inner ends of said petals forming said throat portion substantially continuous in the circumferential direction.

10. The combination of claim 7, wherein said throat portion has a longitudinal length such that, when mounted, said throat portion substantially encompasses a diffuser of said airbag inflator.

11. The combination of claim 7, wherein said inner ends of said petals are not secured to each other, and are arranged to permit gas flow therebetween above a predetermined pressure.

12. The combination of claim 11, wherein said sheets are angularly offset with respect to each other such that said inner ends of said petals forming said throat portion are substantially continuous in the circumferential direction.

13. A cushion for an airbag module, comprising:
a flexible body;
a mouth in said body permitting entry of a gas to inflate said body; and
a mounting portion secured to said body in proximity to said mouth, said mounting portion taking the form of a radially interior section of a torroid, with a throat portion having longitudinal ends and an outer collar extending radially outward from one of said ends, and further including an inner collar extending radially from the other of said ends in spaced parallel relation to said outer collar, said inner collar being secured to said body, said mounting portion being formed of at least one elongated strip, said at least one strip having short dimension ends secured together, and a plurality of cuts extending inward from long dimension sides to a central section, said central section defining said throat portion, said cuts defining a plurality of outer tabs along one of said sides and a plurality of inner tabs along the other of said sides, said tabs extending radially outward such that said outer tabs define said outer collar, and said inner tabs define said inner collar.

14. A cushion as in claim 13, wherein said mounting portion includes a plurality of said strips.

15. A cushion as in claim 14, wherein said cuts forming said outer tabs are formed at an angle to said associated side, said angle alternating with adjacent ones of said strips such that said outer tabs of said adjacent ones of said strips overlap a substantially constant amount in the radial direction.

16. A cushion as in claim 14, wherein said tabs of said respective strips are angularly offset to cause said collars to be substantially continuous.

17. A cushion as in claim 16, wherein said cuts forming said outer tabs are formed at an angle to said associated side, said angle alternating with adjacent ones of said strips such that said outer tabs of said adjacent ones of said strips overlap a substantially constant amount in the radial direction.

18. A cushion as in claim 13, in combination with an airbag inflator and a mounting plate, said outer collar being interposed between a flange of said inflator and said mounting plate, and said mounting plate being interposed between said outer collar and said body of said cushion.

19. The combination of claim 18, wherein said mounting portion includes a plurality of said strips.

20. The combination of claim 19, wherein said cuts forming said outer tabs are formed at an angle to said associated side, said angle alternating with adjacent ones of said strips such that said outer tabs of said adjacent ones of said strips overlap a substantially constant amount in the radial direction.

21. The combination of claim 19, wherein said tabs of said respective strips are angularly offset to cause said collars to be substantially continuous.

22. The combination of claim 21, wherein said cuts forming said outer tabs are formed at an angle to said associated side, said angle alternating with adjacent ones of said strips such that said outer tabs of said adjacent ones of said strips overlap a substantially constant amount in the radial direction.

* * * * *